(12) United States Patent
Bauer et al.

(10) Patent No.: US 9,868,329 B2
(45) Date of Patent: Jan. 16, 2018

(54) SPRING BRACKET ARM

(71) Applicant: ZF FRIEDRICHSHAFEN AG, Friedrichshafen (DE)

(72) Inventors: Manuel Bauer, Tittling (DE); Paul Lenz, Waldkirchen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/318,803

(22) PCT Filed: Jun. 9, 2015

(86) PCT No.: PCT/EP2015/062793
§ 371 (c)(1),
(2) Date: Dec. 14, 2016

(87) PCT Pub. No.: WO2016/005125
PCT Pub. Date: Jan. 14, 2016

(65) Prior Publication Data
US 2017/0120707 A1    May 4, 2017

(30) Foreign Application Priority Data
Jul. 7, 2014 (DE) .................. 10 2014 213 098

(51) Int. Cl.
*B60G 9/04* (2006.01)
*B60G 11/16* (2006.01)

(52) U.S. Cl.
CPC ............... *B60G 9/04* (2013.01); *B60G 11/16* (2013.01); *B60G 2206/012* (2013.01); *B60G 2206/81* (2013.01)

(58) Field of Classification Search
CPC .... B60G 9/04; B60G 11/16; B60G 2206/012; B60G 11/28
See application file for complete search history.

(56) References Cited

U.S. PATENT DOCUMENTS

| | | | | |
|---|---|---|---|---|
| 5,409,254 A | * | 4/1995 | Minor | B60G 9/003 267/190 |
| 2003/0137121 A1 | * | 7/2003 | Lenz | B60B 35/002 280/124.128 |

(Continued)

FOREIGN PATENT DOCUMENTS

| | | | | |
|---|---|---|---|---|
| DE | 3921468 C1 | * | 5/1990 | ............. B60G 7/001 |
| DE | 3927987 A1 | * | 2/1991 | ............. B60G 99/00 |

(Continued)

*Primary Examiner* — Nicole T Verley
(74) *Attorney, Agent, or Firm* — Cozen O'Connor

(57) ABSTRACT

A spring carrier of a motor vehicle axle, particularly of a portal axle, with a longitudinal portion (1) and a flange portion (2) which adjoins the one end of the longitudinal portion (1) and which has a flange (8). The longitudinal portion (1) includes at least one fastening point for fastening to a shock absorber and/or to a suspension. At least the longitudinal portion (1) of the spring carrier arm comprises a lower shell (4) and an upper shell (3) of metallic material or of a plastic with or without fiber reinforcement, the shell edges (6, 7) thereof extending along the neutral bending axis (5) of the spring carrier arm, and the lower shell (4) and upper shell (3) are connected to one another along the neutral bending axis (5) of the spring carrier arm by bonding engagement.

15 Claims, 4 Drawing Sheets

(56) References Cited

U.S. PATENT DOCUMENTS

| | | |
|---|---|---|
| 2007/0047082 A1 | 3/2007 | Seaver |
| 2007/0199763 A1 | 8/2007 | Henze |
| 2008/0150249 A1 | 6/2008 | Murata |
| 2013/0328281 A1* | 12/2013 | Lenz ........................ B60G 9/00 280/124.1 |
| 2014/0062043 A1* | 3/2014 | Boterdaele ............. B62D 47/02 280/81.6 |

FOREIGN PATENT DOCUMENTS

| | | | |
|---|---|---|---|
| DE | 10011845 A1 * | 9/2001 | ............. B60G 7/001 |
| DE | 10223118 | 12/2003 | |
| DE | 10337193 | 3/2005 | |
| DE | 102004003631 A1 * | 8/2005 | ............. B60G 11/28 |
| DE | 102004041427 | 3/2006 | |
| DE | 102006015672 | 10/2007 | |
| DE | 102011005311 | 9/2012 | |
| EP | 2607115 | 6/2013 | |
| EP | 2982529 A1 * | 2/2016 | ............. B60G 11/27 |
| FR | 1292680 A * | 5/1962 | ............... B60G 3/24 |
| JP | 3617272 B2 * | 2/2005 | ........... B60G 21/051 |
| WO | WO-2007091378 A1 * | 8/2007 | ............. B60G 3/202 |

\* cited by examiner

SPRING BRACKET ARM

PRIORITY CLAIM

This is a U.S. national stage of application No. PCT/EP2015/062793, filed on Jun. 9, 2015. Priority is claimed on the following application: Country: Germany, Application No.: 10 2014 213 098.0, filed: Jul. 7, 2014, the content of which is incorporated herein in its entirety by reference.

FIELD OF THE INVENTION

The invention is directed to a spring carrier arm of a spring carrier of a motor vehicle axle, particularly of a portal axle, having a longitudinal portion and a flange portion which adjoins the one end of the longitudinal portion and which has a flange, and the longitudinal portion includes at least one fastening point for fastening to a shock absorber and/or to a suspension.

BACKGROUND OF THE INVENTION

Spring carrier arms of spring carriers are used in motor vehicle axles to carry out a connection of the motor vehicle axle to the motor vehicle. Particularly in vehicle axles in busses, the spring carrier has two spring carrier arms by which a connection is made in front of and behind the wheels of the motor vehicle axle in longitudinal direction of the vehicle to the shock absorber and air springs positioned in those locations. The respective spring carrier can be composed of individual spring carrier arms which engage at a housing disposed therebetween, for example, a portal housing or an axle housing.

It is known to construct spring carrier arms of the type mentioned above as castings. These castings have the disadvantage of being very heavy due to technical reasons pertaining to the mold and core and therefore form large unsprung masses in the motor vehicle.

Therefore, it is an object of the invention to provide a spring carrier arm of the type mentioned in the introductory part which has reduced weight and high loading capacity.

SUMMARY OF THE INVENTION

This object is met according to the invention in that at least the longitudinal portion of the spring carrier arm comprises a lower shell and an upper shell of metallic material or plastic with or without fiber reinforcement, the shell edges thereof extending along the neutral bending axis of the spring carrier arm, and the lower shell and upper shell are connected to one another along the neutral bending axis of the spring carrier arm by bonding engagement. As used herein, the term "bonding engagement" is meant to include positive substance jointing by atomic or molecular forces and thus means components held together by welding, soldering and/or gluing.

This construction makes it possible to configure the spring carrier arm substantially only according to stability criteria free from the technical conditions pertaining to casting so that its weight can be appreciably reduced.

However, the unsprung masses in the motor vehicle are also reduced in this way.

The expenditure on producing the spring carrier arm is substantially less than in the prior art so that production costs and expenditure on labor and apparatus are also reduced.

Due to the fact that the upper shell and the lower shell are welded together along the neutral bending axis of the spring carrier arm in which the stresses are lowest when the spring carrier arm is under load, the delicate weld joint of these two parts is loaded especially lightly. This also contributes to a lightweight construction of the spring carrier arm.

A reduction in production costs and expenditure on labor and apparatus results when the flange portion and the longitudinal portion are connected to one another by a bonding engagement.

In this respect, when the flange portion has a connection piece which is welded to the longitudinal portion at a distance from the flange of the flange portion, and the connection piece and longitudinal portion have the same cross sections in their welded area, the welded joint is located far from the stress-critical region of the transition from the connection piece to the flange and is not subjected to the high loading occurring at this transition region.

The end region of the longitudinal portion opposite the flange portion can form a transverse portion extending at an angle to the portion of the longitudinal portion which extends from the flange portion.

Further, the underside of the lower shell can have a downward inclination from the flange portion to the end remote of the flange portion.

When the lower shell has a continuous, downward-facing opening at its end region remote of the flange portion, this allows water to flow out naturally from the interior of the spring carrier arm. This reduces the weight of the spring carrier arm at the same time.

In order to obtain an exactly aligned fastening point without requiring a machining for a shock absorber and/or a suspension, the fastening points for fastening a shock absorber and/or a suspension can be spring supports which are inserted into corresponding openings at the upper side of the upper shell.

Preferably one or both spring supports are inserted into the openings of the upper shell with a press fit without an appreciable expenditure on assembly.

When greater security is required for the connection of the spring supports to the upper shell, one or both spring supports can also be connected to the upper shell by bonding engagement.

To fasten the suspension, particularly an air suspension, it was known heretofore to screw the air spring to the spring carrier from below by means of a screw via a through-hole. A through-hole in the lower shell which serves for screwing on the air spring, but which impairs the stability of the spring carrier arm, can be omitted when the fastening point for fastening a shock absorber and/or a suspension has a threaded bore hole formed at the upper side of the upper shell or at the spring support.

If the upper shell and/or the lower shell are formed steel parts, they have a high strength with the lowest possible weight. The forming radii can be so varied that the stress under load is optimally distributed.

High strength with low weight also results when the flange portion is a forged part.

When the flange portion and/or the longitudinal portion are/is made of fine-grain steel, a high strength is achieved while retaining good weldability of the parts.

BRIEF DESCRIPTION OF THE DRAWINGS

An embodiment example of the invention will be described more fully in the following with reference to the drawings in which.

DETAILED DESCRIPTION OF THE PRESENTLY PREFERRED EMBODIMENTS

Figure 1:
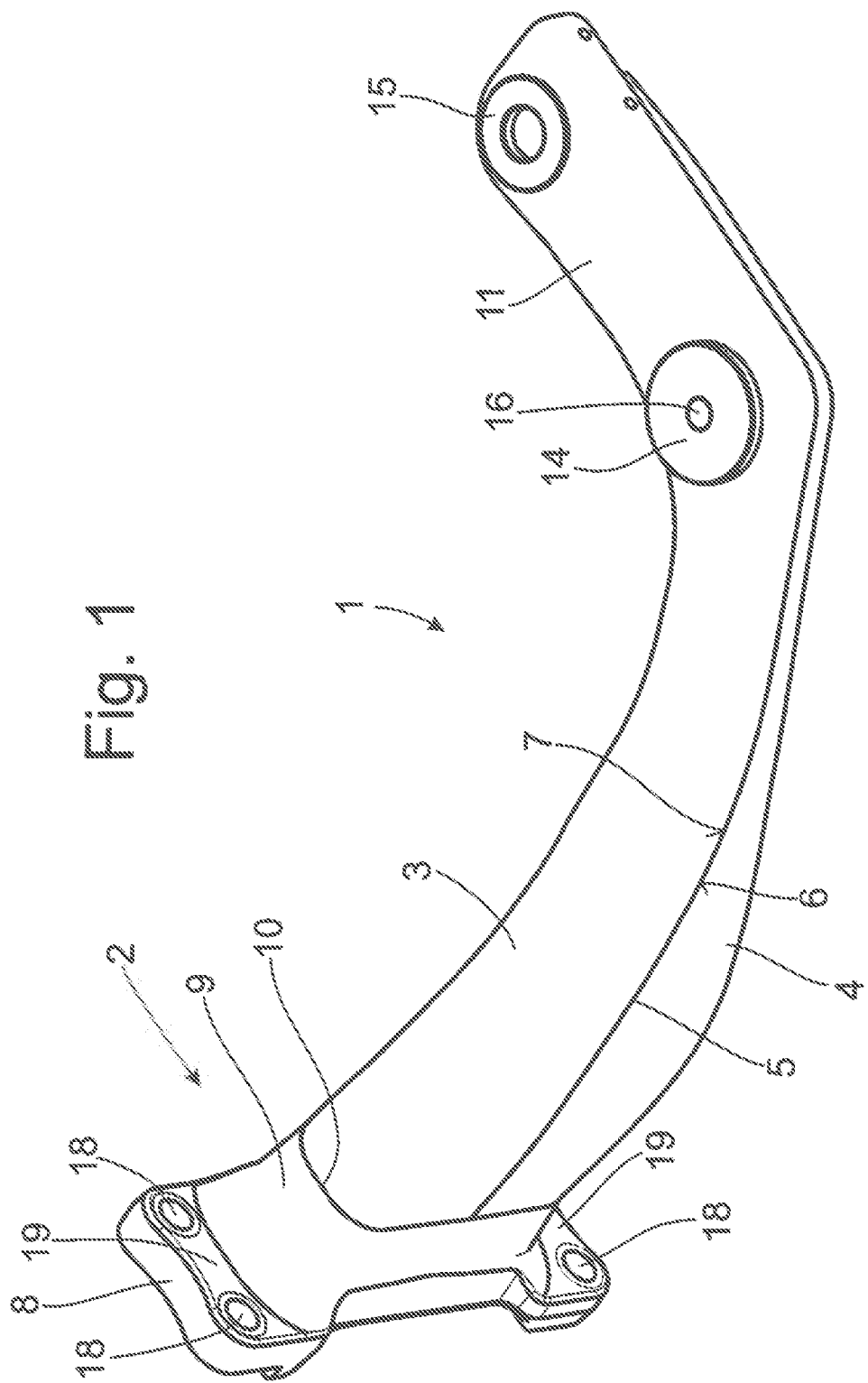
FIG. 1 is a perspective view of a spring carrier arm of the present invention.

The spring carrier arm (shown) of a spring carrier of a motor vehicle axle comprises a longitudinal portion 1 and a flange portion 2, the longitudinal portion comprising an upper shell 3 and a lower shell 4.

The upper shell 3 and lower shell 4 are formed parts of metal material or of a plastic with or without fiber reinforcement and have U-shaped cross sections which have their approximately greatest cross section at the end adjoining the flange portion 2. The cross sections of upper shell 3 and lower shell 4 decrease toward the end opposite the flange portion 2.

As shown upper shell 3 and lower shell 4 are welded together at the free shell edges 6, 7 of the "U" s. This welding extends along the neutral bending axis 5 of the spring carrier arm. However, the upper shell and lower shell can also be glued or connected to one another in another manner known to the person skilled in the art by bonding engagement.

The flange portion 2 which is produced as forged part comprises a flange 8 and a connection piece 9. The free end of the connection piece 9 is welded along an interface 10 to the large-cross section end of the spring carrier arm having the same cross section. However, they can also be glued or connected to one another in some other manner known to the person skilled in the art by bonding engagement.

The end region of the longitudinal portion 1 opposite the flange portion 2 forms a transverse portion 11 extending at an angle to the portion of the longitudinal portion 1 which extends from the flange portion 2.

Figure 4:
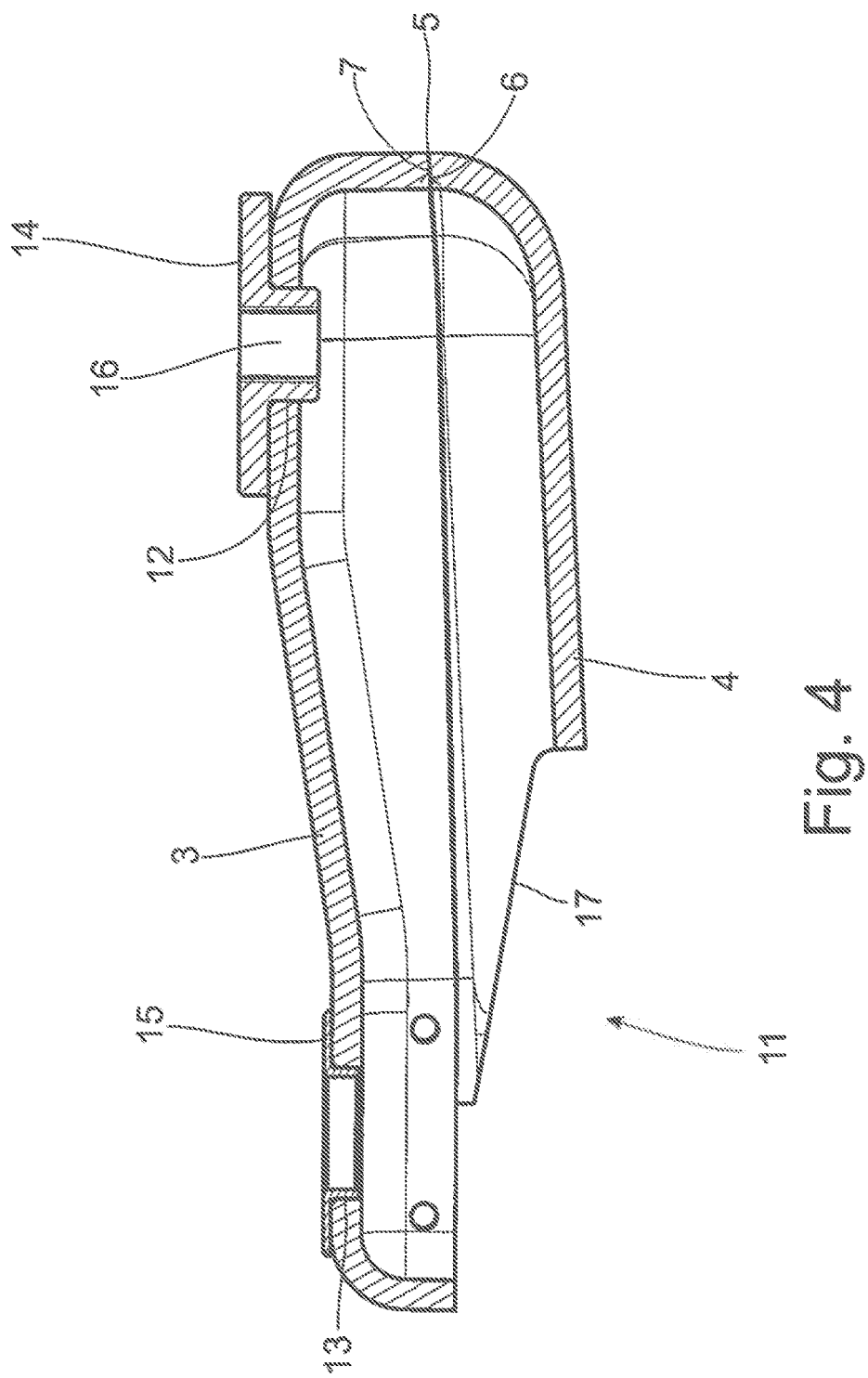
FIG. 4 is a sectional view of a transverse portion of the spring carrier arm according to FIG. 1.

As shown in FIG. 4 at the bend into the transverse portion 11 and at the free end region of the transverse portion 11, the upper shell 3 has in each instance a circular opening 12 and 13. Spring supports 14 and 15 also having a circular cross section are inserted into the openings 12 and 13 with a press fit.

The spring supports 14 and 15 are constructed in a stepped manner and are inserted into the opening 12 and 13, respectively, by their small step.

The spring support 14 provided for supporting an air spring has a centric threaded bore hole 16 to which the air spring can be fastened via a threaded bolt.

The spring support 15 is provided for supporting a shock absorber.

Figure 2:
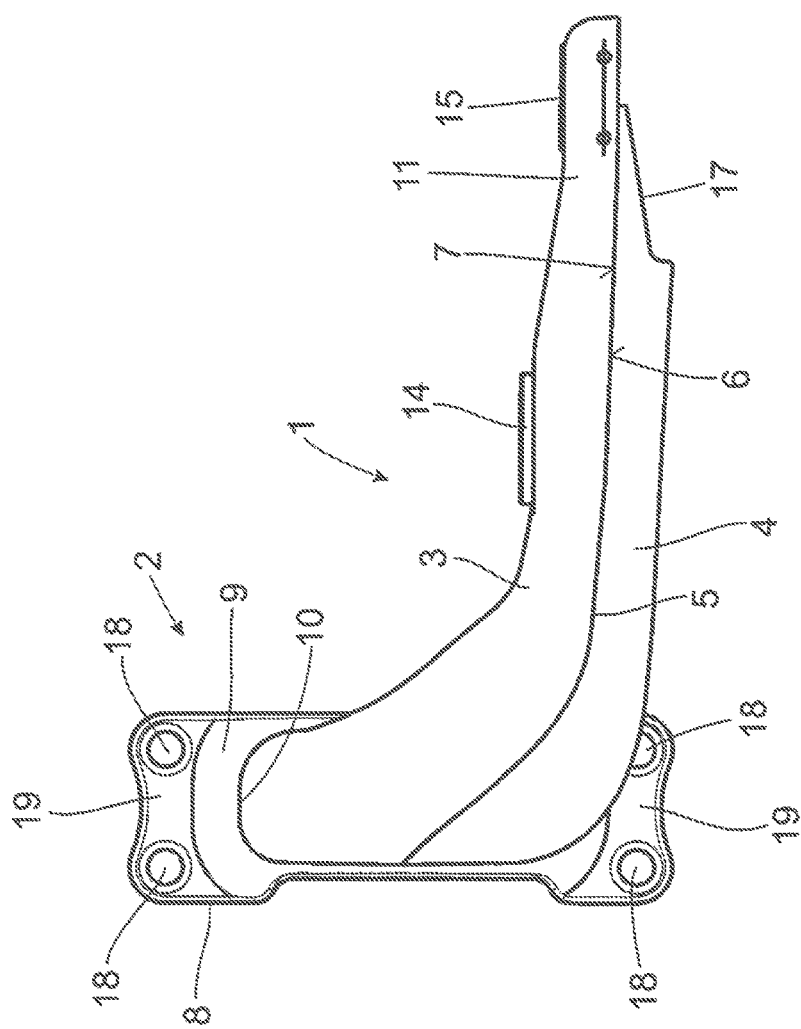
FIG. 2 is a front view of the spring carrier arm according to FIG. 1.
Figure 3:
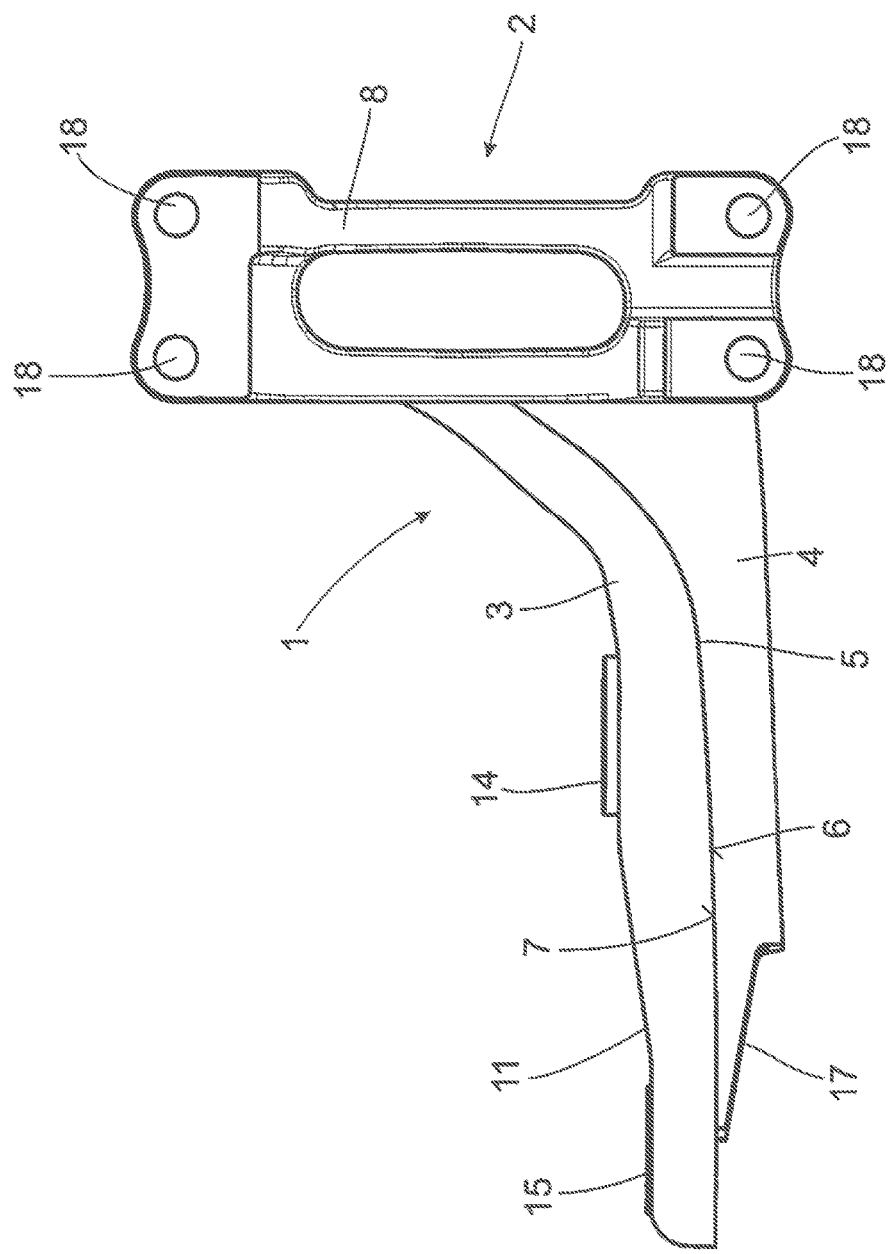
FIG. 3 is a rear view of the spring carrier arm according to FIG. 1.

In its installed position, the underside of the lower shell 4 inclines downward from the flange portion 2 to the end remote of the flange portion 2 (FIG. 2).

The lower shell 4 further has at its end region remote of the flange portion 2 an opening 17 which faces downward and which is formed as a cutout.

Liquid, e.g., water splashed from the road, which has penetrated into the interior of the spring carrier arm can flow toward the opening 17 through the inclination of the lower shell 4 and can run off through this opening 17.

At its corner areas, the rectangular flange 8 has through-holes 18 for a screw fastening. In the forged flange portion 2, the screw supports 19 surrounding the through-holes 18 can be produced with a quality such that no further machining is required.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A spring carrier arm of a spring carrier of a motor vehicle axle comprising:
   a longitudinal portion (1) having an end and a flange portion (2) adjoining the end of the longitudinal portion (1),
   wherein the longitudinal portion (1) includes at least one fastening point for fastening to a shock absorber and/or to a suspension;
   a flange (8) and a neutral bending axis;
   the longitudinal portion (1) of the spring carrier arm comprising a lower shell (4) and an upper shell (3) of metallic material or of a plastic with or without fiber reinforcement; the lower shell (4) and upper shell (3) having shell edges (6, 7) extending along the neutral bending axis (5) of the spring carrier arm; and wherein the lower shell (4) and upper shell (3) being connected to one another along the neutral bending axis (5) of the spring carrier arm by a bonding engagement.

2. The spring carrier arm according to claim 1, wherein the flange portion (2) is connected to the longitudinal portion (1) by a bonding engagement.

3. The spring carrier arm according to claim 2, wherein the flange portion (2) comprises a connection piece (9) which is connected to the longitudinal portion (1) in a connection area at a distance from the flange (8) of the flange portion (2) by a bonding engagement; and wherein the connection piece (9) and the longitudinal portion (1) have the same cross sections in their respective connection area.

4. The spring carrier arm according to claim 1, wherein the longitudinal portion (1) has an end region opposite the flange portion (2) forming a transverse portion (11) extending at an angle to a portion of the longitudinal portion (1) which extends from the flange portion (2).

5. The spring carrier arm according to claim 1, wherein the lower shell (4) comprises an underside having a downward inclination from the flange portion (1) to the end remote of the flange portion (1).

6. The spring carrier arm according to claim 1, wherein the lower shell (4) has an end region remote of the flange portion (2) and a continuous, downward-facing opening (17) at the end region (2).

7. The spring carrier arm according to claim 1, wherein the upper shell (3) comprises an upper side having openings (12, 13); the carrier arm additionally comprising fastening points for fastening a shock absorber and/or a suspension, the fastening points including spring supports (14, 15) which are inserted into the openings (12, 13) at the upper side of the upper shell (3).

8. The spring carrier arm according to claim 7, wherein at least one of the spring supports (14, 15) are inserted into the openings (12, 13) of the upper shell (3) with a press fit.

9. The spring carrier arm according to one of claim 8, wherein at least one of the spring supports (14, 15) is connected to the upper shell (3) by a bonding engagement.

10. The spring carrier arm according to one of claim 7, wherein at least one of the spring supports (14, 15) is connected to the upper shell (3) by a bonding engagement.

11. The spring carrier arm according to claim 7, wherein a fastening point for fastening a shock absorber and/or a suspension has a threaded bore hole (16) formed at the upper side of the upper shell (3) or at the spring support (14, 15).

12. The spring carrier arm according to claim 1, wherein the upper shell (3) and/or the lower shell (4) of metallic material or of a plastic with or without fiber reinforcement are constructed by forming.

13. The spring carrier arm according to claim 1, wherein the flange portion (2) is a forged part of metal or a structural component part which comprises a composite material with metal inserts or a plastic with or without fiber reinforcement.

14. The spring carrier arm according to claim 1, wherein the flange portion (2) and/or the longitudinal portion (1) are/is made of a metallic material, or of a plastic with or without fiber reinforcement.

15. The spring carrier arm according to claim 14, wherein the metallic material is fine-grain steel.

\* \* \* \* \*